Inventors
ALEC H. REEVES
JOHN C. PRICE
By [signature]
Attorney

Inventors
ALEC H. REEVES
JOHN C. PRICE
By Percy P. Lantzy
Attorney

Inventors
ALEC H. REEVES
JOHN C. PRICE
By Percy P. Lantzy
Attorney

Inventors
ALEC H. REEVES
JOHN C. PRICE
By [signature]
Attorney

Inventors
ALEC H. REEVES
JOHN C. PRICE
By [signature]
Attorney

Inventors
ALEC H. REEVES
JOHN C. PRICE
By [signature]
Attorney

Inventors
ALEC H. REEVES
JOHN C. PRICE
By [signature]
Attorney

Inventors
ALEC H. REEVES
JOHN C. PRICE
By [signature]
Attorney

United States Patent Office 3,430,228

Patented Feb. 25, 1969

3,430,228

PARALLEL-TO-SERIAL CONVERTER FOR A BINARY CODE GENERATOR

Alec Harley Reeves and John Clifford Price, London, England, assignors to International Standard Electric Corporation, New York, N.Y., a corporation of Delaware Filed Oct. 13, 1965, Ser. No. 495,604
Claims priority, application Great Britain, Oct. 30, 1964, 44,315/64
U.S. Cl. 340—347 19 Claims
Int. Cl. H04l *3/00;* H03k *13/00*

This invention relates to binary code generators of the serial output type and more particularly to an analog-to-digital converter or coder of the parallel type as described in the U.S. copending application of A. H. Reeves, Ser. No. 366,778, filed May 12, 1964, now Patent No. 3,320,605 and a parallel-to-serial converter coacting therewith to provide a binary code generator of the serial output type.

In the above cited copending application there is described a coder in which an analog step function or PAM (pulse amplitude modulation) pulse is imposed on a system of intercoupled bistable devices, each having different switching characteristics. However, any one of a number of different code combinations may be generated by the system when the step function only is applied. But when a damped oscillation is superimposed on the step function, at the termination of the oscillation the system of bistable devices will be in equilibrium and only one particular code combination can be generated—that corresponding to the input level of the PAM pulse. The above cited copending application also describes how, with an optimum damped oscillation, the bistable devices will be set to give an indication of their final condition in a predetermined time sequence at regular time intervals corresponding to the periods of the damped oscillation. Thus, the first and most significant bistable device is either set to its final condition or indicates its future final condition at the end of the first complete cycle of the damped oscillation. The next most significant bistable device is either set to its final condition or indicates its future final condition as the end of the second cycle of the damped oscillation, and so on. It will be noted that each bistable device may proceed through one or more swings or oscillations to its other condition and back again before finally settling down. However, it is a feature of the coder that this final condition for each bistable device can be determined at a time which is governed by the optimum damped oscillation, as described above. Moreover, the final conditions of the bistable devices will be indicated in a regular order, starting with the most significant bistable device, even though bistable devices of lesser significance settle to their final condition before bistable devices of greater significance.

Thus, the coder described in the above cited copending application is one in which the number of coding elements is the same as in previously known serial converters, i.e. one coding element per output digit, but the speed of operation is considerably increased and is comparable to that of a parallel coder. This is because in conventional serial type coders each of the bistable elements have to move in strict sequence, each one settling to within about half a quantum step before the next can actually start operating. In the coder described in the above cited copending application, however, a large part of these movements can occur simultaneously. The output of such a coder is presented in a parallel form, i.e. there are as many bistable devices as there are digits, but in fact the digits can be determined in a serial manner before the system of bistable devices has come to rest. However, the digits cannot be presented as a serial output at the times at which they can be determined because, as stated above, the bistable devices may continue to oscillate between their two conditions before finally settling down.

Therefore, an object of this invention is to provide a binary code generator of the serial output type incorporating the coder of the above cited copending application.

A feature of this invention is the provision of a binary code generator comprising a plurality of bistable devices coupled to a source of analog signal including a pulse signal whose amplitude is to be coded into a code group having a plurality of digits during a predetermined period of time and a damped oscillatory signal having a given frequency to divide the predetermined period of time into equal time intervals superimposed on the pulse signal; each of the bistable devices having a different switching characteristic to produce different ones of the digits of the code group, the bistable deivces being activated by the analog signal with certain ones thereof oscillating between their two stable conditions throughout the predetermined period of time in response to the damped oscillatory signal whose amplitude characteristic is selected to cause the bistable devices to indicate their final stable condition in a predetermined time sequence, one of the bistable devices being set at the end of the first of the time intervals to indicate its final stable conditions and the others of the bistable devices being set at the end of successive ones of the time intervals to indicate their final stable condition; a source of control signals having a frequency equal to the given frequency, a predetermined amplitude and a predetermined polarity relative to the polarity of the output signals of the bistable devices; and a circuit arrangement to combine the output signals of the bistable devices with the control signal to cancel the output signals from the bistable devices when any of the bistable devices is in a predetermined one of the two stable conditions after each of the bistable devices is set to indicate its final stable condition and to produce an output pulse when any of the bistable devices is in the other of the two stable conditions after each of the bistable devices is set to indicate its final stable condition.

The above-mentioned and other features and objects of this invention will become more apparent by reference to the following description taken in conjunction with the accompanying drawings in which.

Figure 1:
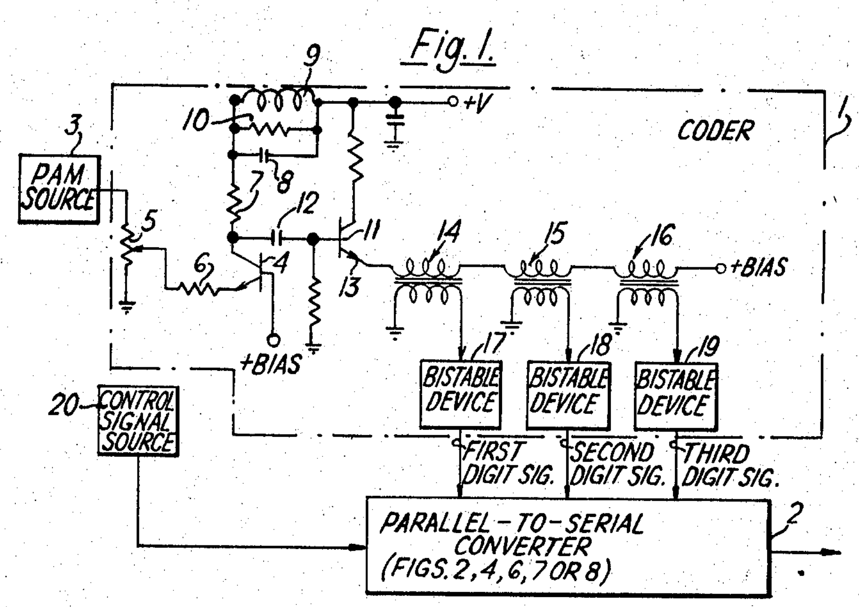
FIG. 1 is a schematic diagram partially in block diagram form of one embodiment of the code generator in accordance with the principles of this invention.

Referring to FIG. 1, the code generator of this invention is illustrated as including a three digit coder 1 for purposes of explanation, substantially as described in connection with FIG. 6 of the above cited copending application, and a parallel-to-serial converter 2 which may take any of the forms illustrated in FIG. 2, 4, 6, 7 or 8 of the present application described in greater detail hereinbelow.

Briefly, source 3 of an analog signal sample of PAM pulse to be coded is coupled to coder 1. The output of source 3 is coupled to the input of a common-base transistor amplifier 4 by a gain control potentiometer 5 and a resistor 6. The collector circuit of amplifier 4 is completed by a resistor 7 and a tuned circuit including capacitor 8 and inductor 9 damped by resistor 10. The value of the components of the damped tuned circuit are selected to provide at the collector of amplifier 4 an optimal damped oscillatory signal superimposed on the PAM signal of source 3. This optimal damped oscillatory signal may take the form shown in FIG. 3 of the above cited copending application and as such will set a bistable device to its final stable condition or give an indication of its final stable condition before actually settling down to its final stable condition after a number of oscillations between its two stable conditions.

The collector of amplifier 4 is coupled to the base of an emitter follower stage 11 by a capacitor 12 giving a low impedance source at the emitter 13. The emitter circuit of emitter follower 11 is completed by the transformers 14, 15 and 16. The secondaries of transformers 14, 15 and 16 are coupled to bistable devices 17, 18 and 19, respectively. The switching characteristic of device 17 is established to provide the most significant or first digit, the switching characteristic of device 18 is established to provide the most significant or second digit, and the switching characteristic of device 19 is established to provide the least significant or third digit.

One way of providing the different switching characteristic for bistable devices 17, 18, and 19 is to provide for the least significant digit a bistable device having one unit of voltage between its two stable conditions, for the next significant digit a bistable device having two units of voltage between its two stable conditions, and for the most significant digit a bistable device having four units of voltage between its two stable conditions.

Another way of providing the different switching characteristic for bistable devices 17, 18 and 19 is to employ a bistable element for each bistable device having a constant voltage difference between the two stable conditions and adjust the voltage ratios of the transformers 14, 15 and 16. Thus, in the present example, transformer 14 would have a 4:1 step down voltage ratio to provide at the output of device 17 the most significant digit, transformer 15 would have a 2:1 step down voltage ratio to provide at the output of device 18 the next lower significant digit, and transformer 16 would have a 1:1 voltage ratio to provide at the output of device 19 the least significant digit.

Figure 3:
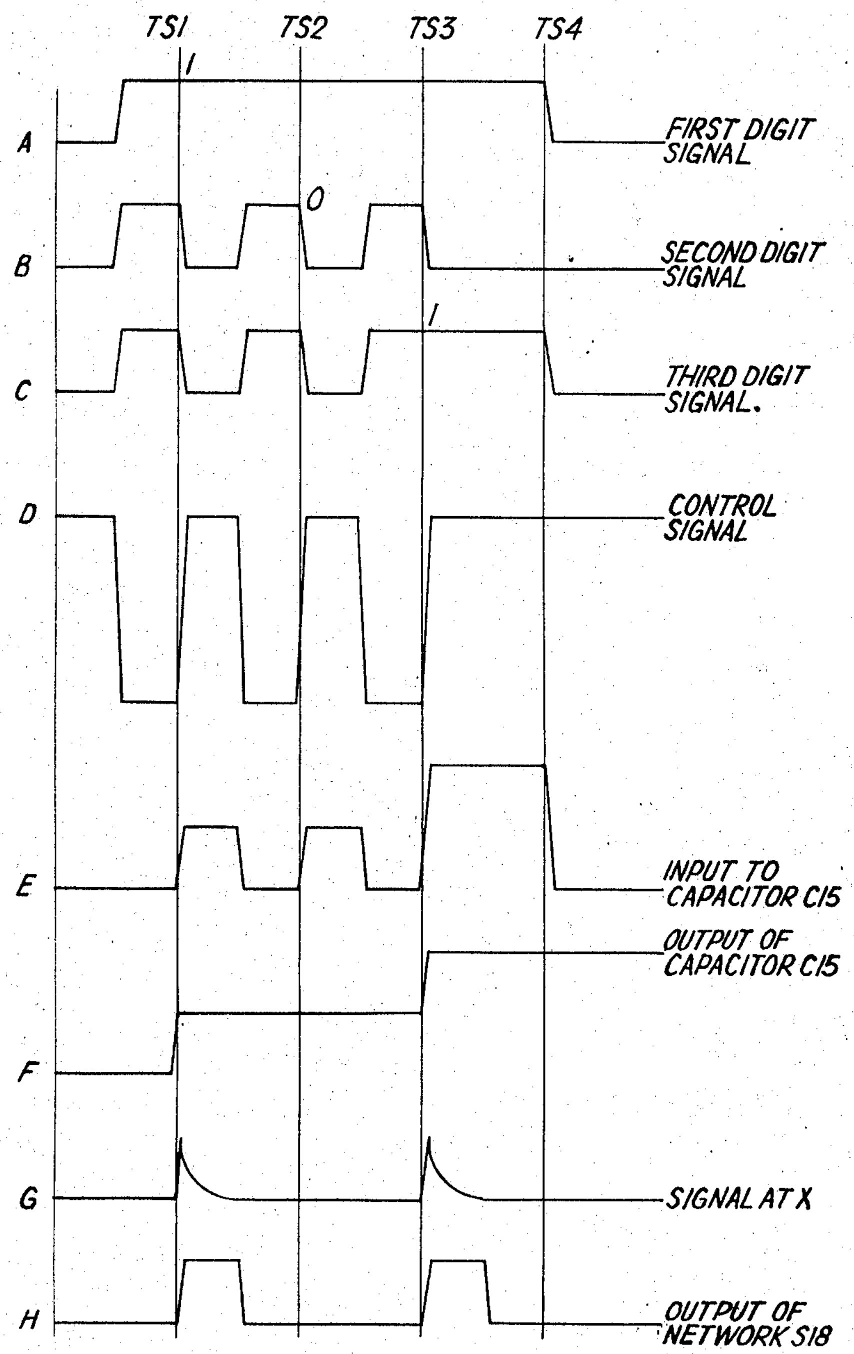
FIG. 3 illustrates various waveforms appearing at different points in the circuit of FIG. 2.

The operation of coder 1 will now be briefly described. The application of a PAM pulse from source 3 excites the damped tuned circuit 8, 9 and 10 to produce an optimal damped oscillatory signal such as illustrated in FIG. 3 of the above cited copending application. This oscillatory signal is applied to transformers 14, 15 and 16 and, hence, to bistable devices 17, 18 and 19. The circuit parameters are chosen such that the first positive half cycle will have a peak amplitude sufficient to switch bistable devices 17, 18 and 19 from their "0" stable condition to their "1" stable condition. On the succeeding negative half cycle having a given amplitude, those bistable devices which are now in the "1" condition and yet have a sufficiently low switching characteristic will here set to the "0" condition. Each succeeding half-cycle will switch those bistable devices whose switching characteristic are less than the amplitude of the relevant half-cycle while leaving those bistable devices whose switching characteristic is larger than the relevant half-cycle in the stable condition they were in previous to the relevant half-cycle. Thus, as the damped oscillatory signal disappears, the diodes will be left in the "0" or "1" condition according to the initial amplitude of the PAM and oscillatory signal and the resulting rate of decay of the oscillatory signal. The stable conditions of bistable devices 17, 18 and 19 are read out as the code combination of the amplitude of PAM signal to be coded.

As pointed out hereinabove, it is a feature of coder 1 that the final condition of each of the bistable devices can be determined prior to the settling down of all bistable devices at a time governed by the optimum damped oscillatory signal. Moreover, what the final conditions of the bistable devices will be is indicated in a predetermined time sequence at regular time intervals starting with the bistable device producing the most significant digit.

In accordance with the principles of this invention, the above feature of coder 1 is utilized to provide the serial output type code generator of this invention by coupling the digit output signals from devices 17, 18 and 19 to converter 2 and combining these digit signals, in a prescribed manner as discussed in greater detail hereinbelow, with a control signal from source 20 to extract from the digit output signals the time sequentially occurring indication of the final condition to which the plurality of bistable devices will settle. The control signal to carry out the present invention must have the same frequency as the frequency of the damped oscillatory signal, an amplitude dictated by the circuit arrangement of converter 2 and a polarity opposite to or 180° out of phase with the digit signal representing the stable conditions of the bistable devices. For instance, if the digit signal is high to represent a "1" condition, the control signal would be low and if the digit signal is low to represent a "0" condition, the control signal would be high.

Figure 2:
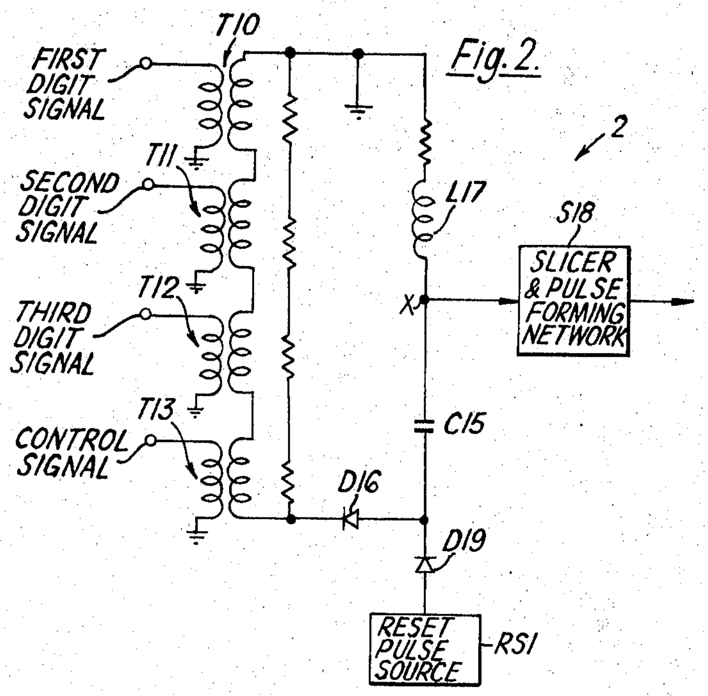
FIG. 2 is a schematic diagram partially in block form of an embodiment of a parallel-to-serial converter of the code generator of FIG. 1.

Referring to FIG. 2, the primary windings of the transformers T10, T11 and T12 are connected to the three bistable devices 17, 18 and 19, respectively, of coder 1, FIG. 1. The signals applied to these transformers are depicted at curves A, B and C, FIG. 3, respectively. Curve A, FIG. 3 represents the output of the most significant bistable device 17, FIG. 1. Device 17, initially in the "0" condition, is switched by the first half cycle of the damped oscillatory signal to the "1" condition. At the end of the first complete cycle of the oscillatory signal time TS1, device 17 remains in the "1" condition, and will remain in this condition until after the cessation of the coding operation, when it is reset to the '0" condition by a reset pulse, shown for convenience as occurring at time TS4. The nature of the coder described briefly in connection with FIG. 1 and in greater detail in the above cited copending application is such that, had the secod half cycle of the damped oscillatory signal been sufficient to switch device 17 back to the "0" condition, then it would have remained there. Alternatively, had the first half cycle of the damped oscillatory signal been insufficient to switch device 17 to the "1" condition, it would have remained in the "0" condition. Thus, in the example chosen the most significant digit coded is a "1."

The second most significant bistable device, device 18, FIG. 1, is subjected to the same input signal, but its switching characteristic is less than that of the most significant device. Therefore, during the first cycle of the input signal device 18 will switch to the "1" condition and back to the "0" condition, as shown in curve B, FIG. 3. This will certainly take place if the input is sufficient to switch device 17, and will take place as long as the input signal exceeds the switching characteristic of device 18. In the present example the first or "0" condition is assumed to be relevant. Therefore, at time TS1 device 18 reverts to the "0" condition. During the second cycle of the input signal it is still sufficient to cycle device 18 from "0" to "1" and back to "0" at time TS2. However, the damped oscillatory signal is chosen so that if device 18 is in the "0" condition at time TS2 it will either remain there or will ultimately settle there. Similarly device 18, if in condition "1" at time TS2, will either remain at "1" or ultimately settle at "1," and remain there until reset at time TS4.

Likewise, curve C, FIG. 3 produced by device 19 will switch from the "0" condition to the "1" condition and back again, until at time TS3 it remains in the "1" condition, until reset at time TS4. Therefore, in the example chosen the level coded is 101.

Transformer T13 in FIG. 2 is supplied with the control signal from source 20, FIG. 1. This control signal, illustrated in curve D, FIG. 3, has the same frequency as the damped oscillatory signal, but its amplitude and polarity are such that when combined with the three digit signals it cancels them whenever all three digit signals are showing "1" condition. Thus, at time TS1 the combined signal (curve E, FIG. 3) applied to the capacitor C15 is zero. During the first half of the second cycle, device 17 remains at "1" while devices 18 and 19 switch to "0," and the combined signal (curve E, FIG. 3) at C15 rises to a value equal to that of curve A, FIG. 3 at this time. During the second half of the second cycle devices 18 and 19 again switch to the "1" condition, so that the control signal (curve D, FIG. 3) again cancels the combined signals of curves A, B and C, FIG. 3. At the start of the third cycle, devices 18 and 19 again switch to the "0" condition, and the combined signal (curve E, FIG. 3) once more rises to a value equal to that of the first digit signal similarly during the second half of the third cycle when all three devices switch to the "1" condition and the combined signal is zero.

At the time TS3, however, only device 18 reverts to the "0" condition, so the combined signal of curve E, FIG. 3 now rises to a value equal to that of the first and third digit signals combined. Since no further switching of the devices takes place, the combined signal, curve E, FIG. 3 remains at this value.

The capacitor C15 provides a peak charge or voltage as illustrated in curve F, FIG. 3. This voltage by means of diode D16 and inductance L17 produces a differentiated signal at point X as illustrated in curve G, FIG. 3. The differentiated signal has two spikes at times TS1 and TS3, and these correspond to the digits "1." At time TS2 there is no differential spike, and, therefore, corresponds to a "0" at this time. Thus, the input to slicer and pulse forming network S18 comprises the digits 101 produced serially at times TS1, TS2 and TS3. This is in contrast to the settling down of the coding elements, which have not all settled down by the time TS1 of TS2, and which do not necessarily settle down in their order of significance.

The signal of curve G, FIG. 3 operated on by slicer and pulse forming network S18, to produce a square pulse signal as illustrated in curve H, FIG. 3 which represents the coded level 101. Finally a reset pulse is applied to the circuit of FIG. 2 from source RS1 through diode D19 and removes the remaining charge from the capacitor C15 at time TS4.

The circuit of FIG. 2, while practical, requires a large amplitude control signal and careful matching of the components, in particular the transformers, to prevent spurious peaks in the output signal. The circuit illustrated in FIG. 4 overcomes these difficulties by utilizing current switching transistor pairs as the bistable devices 17, 18 and 19 and coupling them direct to the serializing arrangement. Another advantage of the circuit of FIG. 4 is that the control signal is combined with the digit signal from each bistable device separately, thus preventing the addition of any individual spurious peaks with one another.

Figure 4:
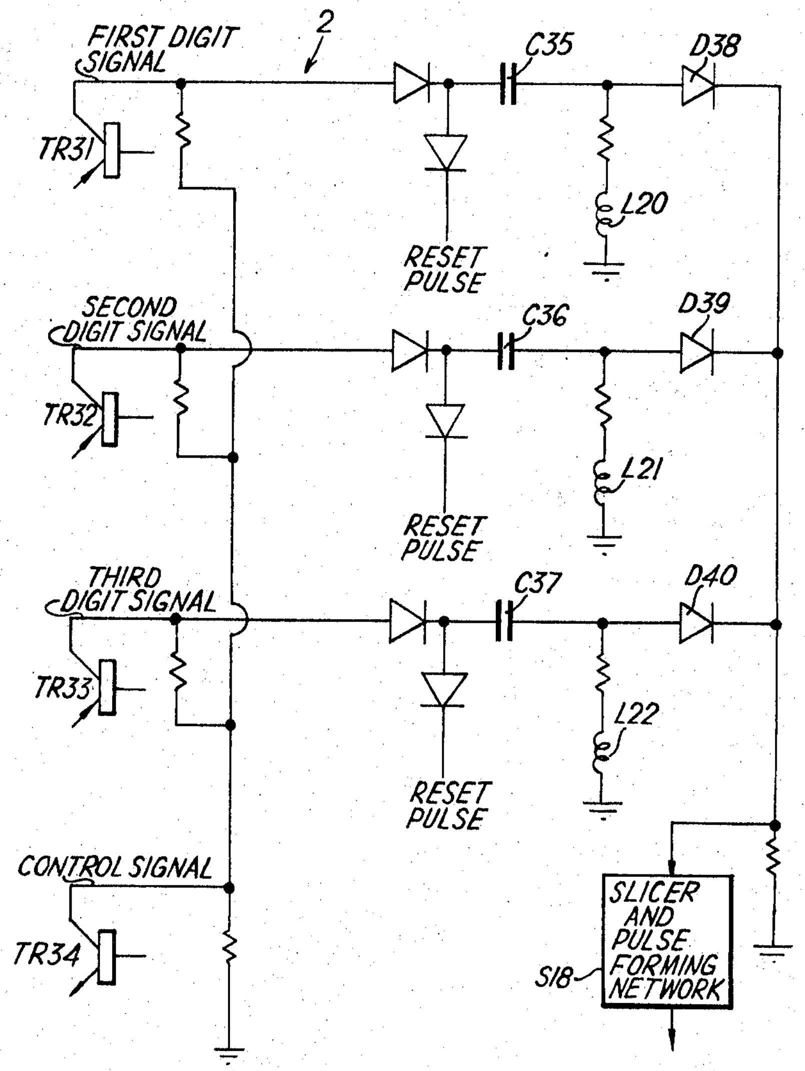
FIG. 4 is a schematic diagram of another embodiment of the parallel-to-serial converter of the code generator of FIG. 1.

Referring to FIG. 4, the transistors TR31, TR32 and TR33 are each one half of an emitter coupled current switching transistor pair which form the three bistable devices 17, 18 and 19, respectively. Transistor TR34 is one half of an emitter coupled transistor pair producing the control signal. The digit signals from transistors TR31, TR32 and TR33 are shown curves A, B and C, FIG. 5, respectively. As in the previous embodiment the coded level is assumed to be 101. The signal of curve A, FIG. 5 switches to the "1" condition, and at time TS1 remains in that condition. Similarly the signal of curve B, FIG. 5 at time TS2 switches to the "0" condition and the signal of curve C, FIG. 5 at time TS3 switch to and remains in the "1" condition.

Figure 5:
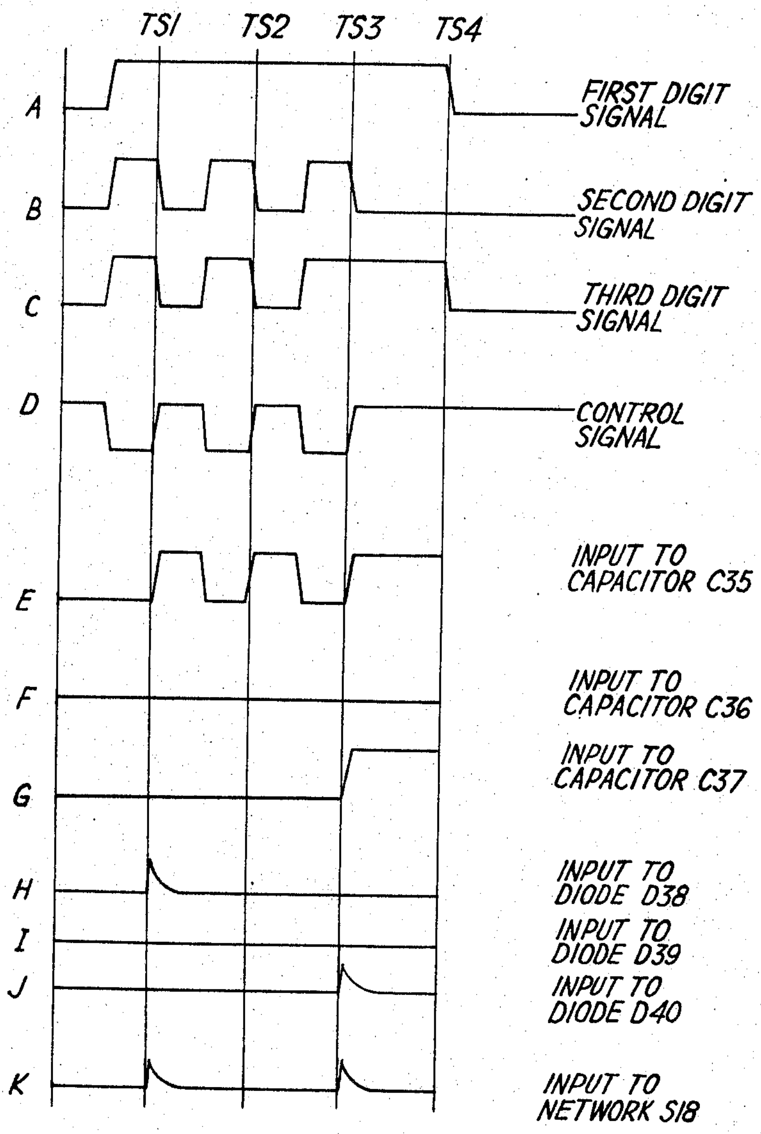
FIG. 5 illustrates various waveforms appearing at different points in the circuit of FIG. 4.

The control signal of Curve D, FIG. 5 in this case has the same amplitude as each of the digit signals when in condition "1," and is combined with each of the digit signals individually. Thus, in FIG. 4 the control signal from transistor TR34 is added to the first digit signal from transistor TR31 and the result, as illustrated in Curve E, FIG. 5, is applied to capacitor C35. Similarly the combination of the control signal and the second digit signal as illustrated in Curve F, FIG. 5, is applied to capacitor C36, and the combination of the control signal and the third digit signal, as illustrated in Curve G, FIG. 5 is applied to capacitor C37. The capacitors C35, C36 and C37 are therefore charged by the resultant combined signals of Curves E, F and G, FIG. 5, respectively. As in the previous example each combined signal is differentiated by differentiators including inductors L20, L21 and L22, respectively to produce a corresponding differentiated signal, as illustrated in Curves H, I and J, FIG. 5, respectively. These differentiated signals are combined in the diode "OR" gate, comprising the diodes D38, D39 and D40, to produce the serial output signal illustrated in Curve K, FIG. 5 containing spikes at times TS1 and TS3. This output signal is then applied to the slices and pulse forming network S18.

Figure 6:
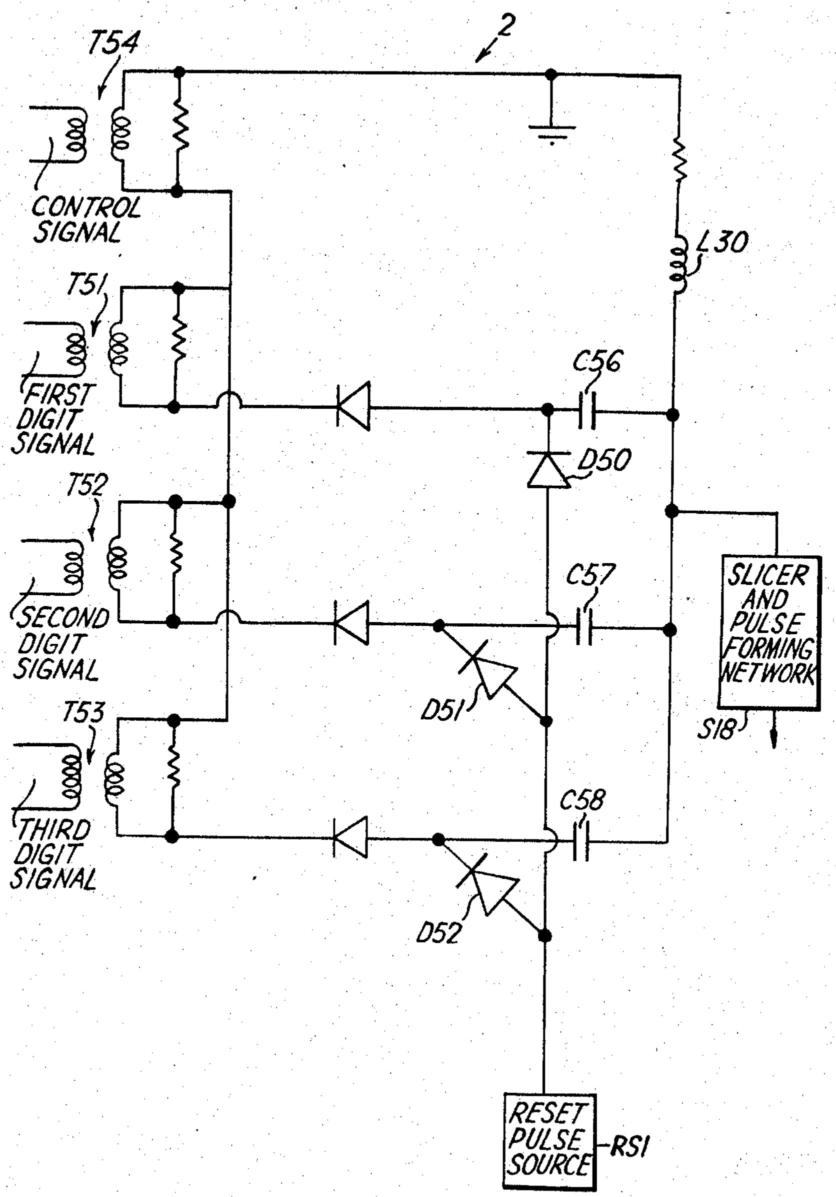
FIG. 6 is a schematic diagram of still another embodiment of the parallel-to-serial converter of the code generator of FIG. 1.

A circuit in which the coding bistable devices 17, 18 and 19 are coupled to the converter 2, FIG. 1 by transformers, but which does not utilize the diode "OR" gate of FIG. 4 is illustrated in FIG. 6. The transformers T51, T52 and T53 couple the bistable devices 17, 18 and 19 to the converter 2, and the control signal is applied to the converter 2 by the transformer T54. The basic operation of the circuit is the same as that of FIG. 4, i.e. the control signal is combined with each digit signal separately. Each capacitor C56, C57 and C58 is charged by a combination of one digit signal and the control signal. The voltage on capacitors C56, C57 and C58 are serially combined and differentiated prior to being coupled to network S18 by the differentiator including inductor L30. The reset is applied through the transformer T55. Pulse is coupled from source RS1 through diodes D50, D51 and D52 to capacitor C56, C57 and C58. This circuit also has the advantage that sneak voltages due to different digits do not add up.

Figure 7:
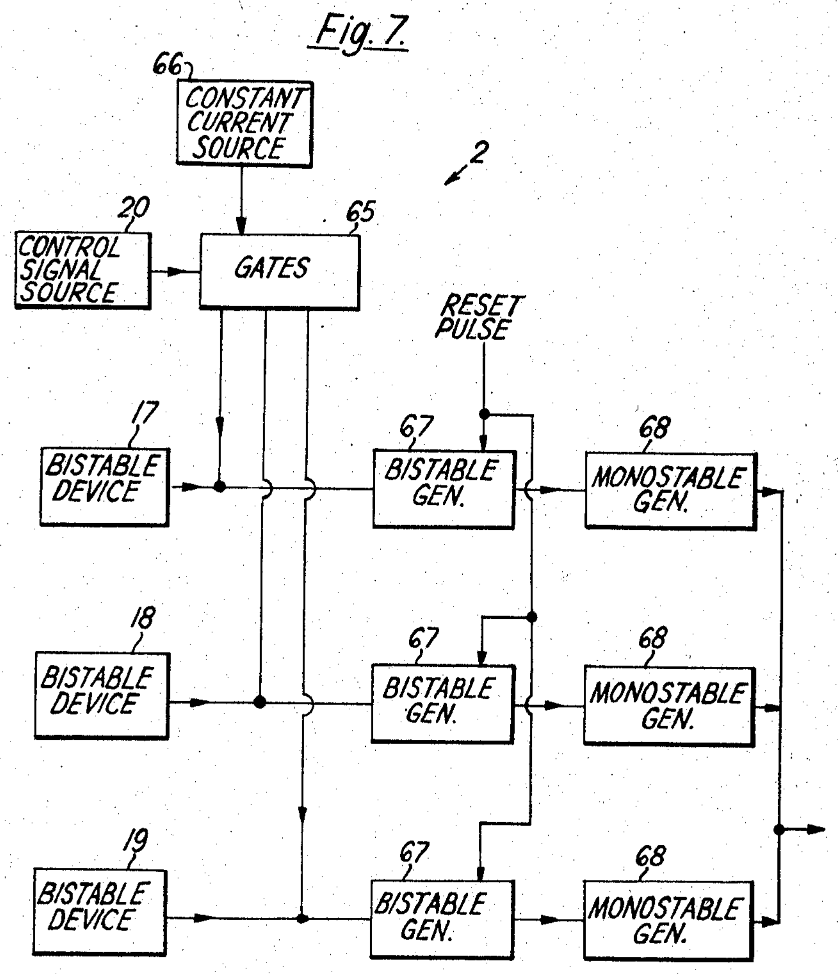
FIG. 7 is a schematic diagram in block form of a further embodiment of the parallel-to-serial converter of the code generator of FIG. 1.

The above circuits all operate by straight-forward combination of the various signals as they are generated. An alternative method of achieving the same result is by the use of logic circuits, and this is illustrated in FIG. 7. The three bistable devices 17, 18 and 19, produce their digit signals as before. The control signal from source 20 is now used to control a series of gates 65 which in turn control current from a constant current source 66. The combinations of digit signals and gated currents are passed to individual bistable pulse generators 67 which are only operative if the combined waveforms add, i.e. when a digit signal is indicating a "1" condition in the appropriate time interval. The ouput signals from the bistable pulse generators 67 drive corresponding monostable pulse generators 68 each of which produces an output pulse if the corresponding coding bistable device indicates a "1" at the appropriate time. The output pulses from the monostable pulse generators 68 are then combined to form the serial code output. Finally a reset pulse is applied to the bistable pulse generators 67 after the coding operation is completed.

Figure 8:
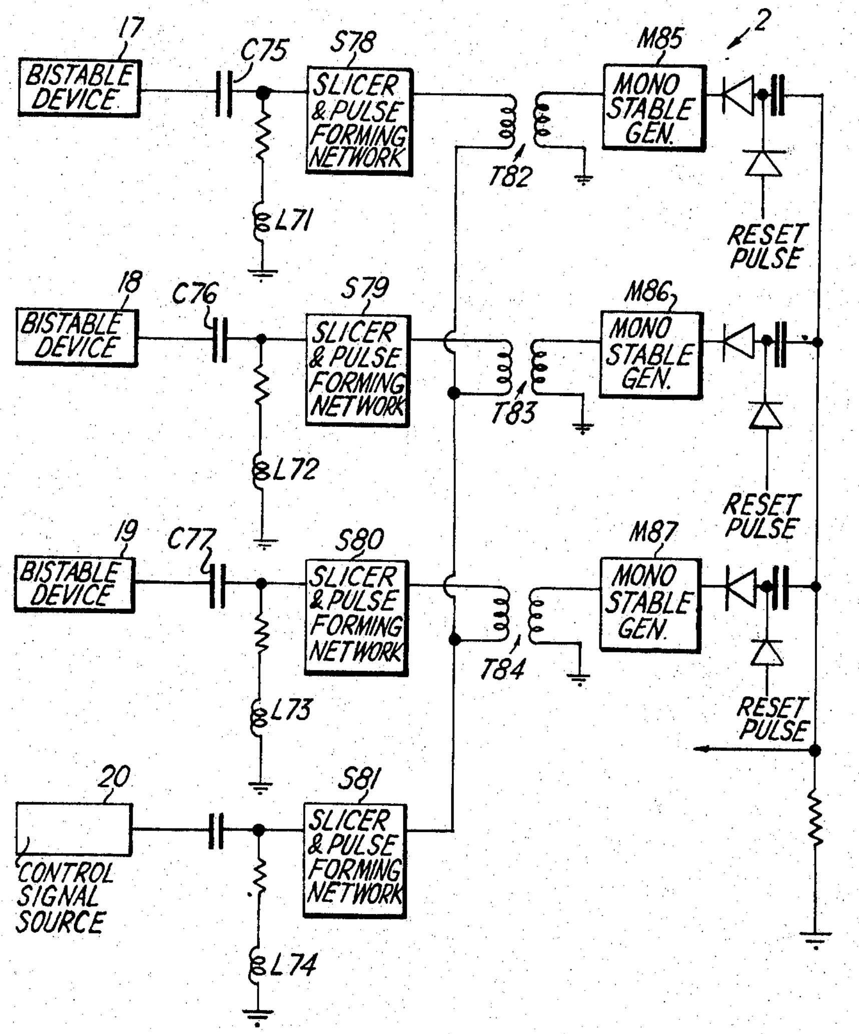
FIG. 8 is a schematic diagram partially in block form of still a further embodiment of the parallel-to-serial converter of the code generator of FIG. 1.
Figure 9:
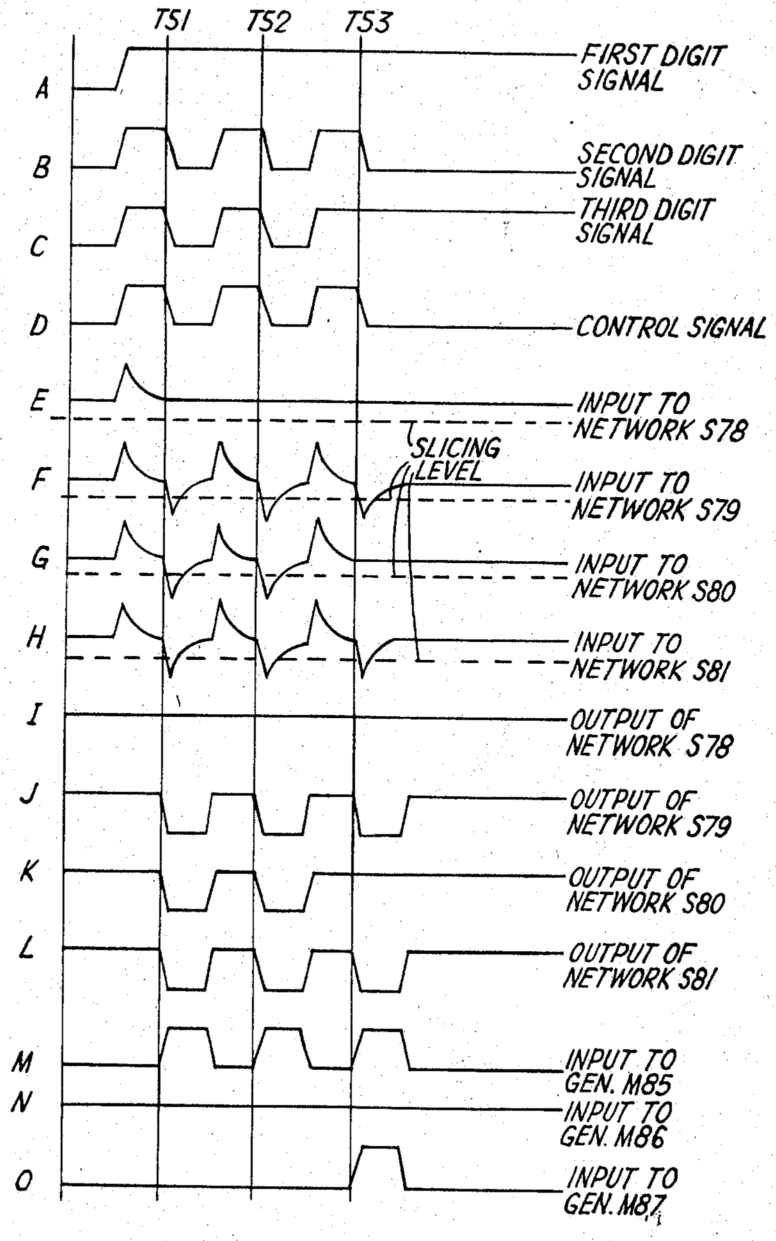
FIG. 9 illustrates various waveforms appearing at different points in the diagram of FIG. 8.

In all the above examples the combining of the digit signal with the control signal, or in the last case the gated current, has taken place before any other processing of the signals, such as differentiating and pulse forming. In the circuit of FIG. 8 the digit signals (Curves A, B and C, FIG. 9) from the coding bistable devices 17, 18 and 19 as in the previous case represent the level 101 and are applied to the capacitors C75, C76 and C77. The voltage stored in these capacitors are differentiated in differentiators including inductors L71, L72 and L73 resulting in the signals illustrated in Curves E, F and G, FIG. 9, respectively. The control signal (Curve D, FIG. 9) is differentiated in the differentiator including L74 resulting in the signal illustrated in Curve H, FIG. 9. The resultant differentiated signals are then sliced and negative going pulses are formed in the networks S78, S79, S80 and S81 resulting in the signals illustrated in Curves I, J, K, and L, FIG. 9, respectively. The resultant signals produced from the digit signals (Curves I, J and K, FIG. 9) are each separately combined with the resultant control signal (Curve L, FIG. 9) in the transformers T82, T83 and T84. The connections to the transformers are such that the control signal of Curve L, FIG. 9 may be subtracted from the output signals of networks S78, S79 and S80 to produce the combined signals as illustrated in Curves M, N and O, FIG. 9. These combined signals are coupled to the monostable pulse generators M85, M86 and M87 to produce the serial coded output signals.

While we have described above the principles of our invention in connection with specific apparatus, it is to be clearly understood that this description is made only by way of example and not as a limitation to the scope of our invention as set forth in the objects thereof and in the accompanying claims.

We claim:

1. A binary code generator comprising:

a source of analog signal to be coded into a code group having a plurality of digits during a predetermined period of time;

said analog signal including a pulse signal whose amplitude is to be coded into said code group and a damped oscillatory signal having a given frequency to divide said predetermined period of time into equal time intervals superimposed on said pulse signal;

a plurality of bistable devices coupled to said source of analog signal, each of said bistable devices having a different switching characteristic to produce different ones of said digits of said code group; said bistable devices being activated by said analog signals with certain ones thereof oscillating between their two stable conditions throughout said predetermined period of time in response to said damped oscillatory signal;

the amplitude characteristic of said damped oscillatory signal being selected to cause said bistable devices to indicate their final stable condition in a predetermined time sequence, one of said bistable devices being set at the end of the first of said time intervals to indicate its final stable condition and the others of said bistable devices being set at the end of successive ones of said time intervals to indicate their final stable condition;

a source of control signals having a frequency equal to said given frequency, a predetermined amplitude and a predetermined polarity relative to the polarity of the output signals of said bistable devices; and a circuit arrangement coupled to said bistable devices and said source of control signal for combining the output signals of said bistable devices with said control signal to cancel the output signals from said bistable devices when any of said bistable devices is in a predetermined one of the two stable conditions after each of said bistable devices is set to indicate its final stable condition and to produce an output pulse when any of said bistable devices is in the other of the two stable conditions after each of said bistable devices set to indicate its final stable condition.

2. A generator according to claim 1, wherein said control signal has an amplitude equal to the combined amplitude of the output signals of said bistable devices when said bistable devices are in said predetermined one of the two stable conditions and a polarity opposite to the polarity of the output signal of said bistable devices representing the two stable conditions of said bistable devices; and said circuit arrangement includes a combining circuit coupled to each of said bistable devices and said source of control signals to algebraically combine the output signals of all said bistable devices and said control signal.

3. A generator according to claim 2, further including a capacitor coupled to said combining circuit to store the peak voltage of said combined output signals of said bistable devices and said control signal; and a differentiator coupled to said capacitor to differentiate said stored peak voltage to produce spikes representing the stable conditions of siad bistable devices at time intervals corresponding to said time intervals at which said bistable devices are set to indicate their final stable condition.

4. A generator according to claim 3, further including a slicer and pulse shaping network coupled to said differentiator to shape said spikes into pulses.

5. A generator according to claim 1, wherein said control signal has an amplitude equal to the amplitude of the output signals of one of said bistable devices when said one of said bistable devices is in said predetermined one of the two stable conditions and a polarity opposite to the polarity of the output signals of said bistable devices representing the two stable conditions of said bistable devices; and said circuit arrangement includes a plurality of combining circuits coupled in common to said source of control signals, and means to couple separately each of said bistable devices to associated ones of said combining circuits to separately algebraically combine the output signals of said bistable device with said control signals.

6. A generator according to claim 6, further including a capacitor coupled to each of said combining circuits to store the peak voltage of said combined output signals of an associated one of said bistable devices and said control signal; and a differentiator coupled to each of said capacitors to differentiate each of said stored peak voltage to produce spikes representing the stable conditions of said bistable devices at time intervals corresponding to said time intervals at which said bistable devices are set to indicate their final stable condition.

7. A generator according to claim 6, further including a slice and pulse shaping network coupled in common to the output of said differentiators to shape said spikes into pulses.

8. A generator according to claim 1, wherein said circuit arrangement includes a plurality of bistable elements, each coupled to an associated one of said bistable devices, a source of current, a plurality of gates coupled in common to said source of current and said source of control signals and means coupling each of said gates to an associated one of said bistable elements.

9. A generator according to claim 1, wherein said circuit arrangement includes a plurality of differentiators, each coupled to an associated one of said bistable devices and said source of control signal, a plurality of slicers, each coupled to an associated one of said differentiators, and a plurality of combining circuits coupled in common said slicer associated with said source of control signals and individually to said slices associated with said associated bistable devices.

10. A binary code generator comprising:

a source of analog signal to be coded into a code group having a plurality of digits during a predetermined period of time;

said analog signal including a pulse signal whose amplitude is to be coded into said code group and a damped oscillatory signal having a given frequency to divide said predetermined period of time into equal time intervals superimposed on said pulse signal;

a plurality of bistable devices coupled to said source of analog signal, each of said bistable devices having a different switching characteristic to produce different ones of the digits of said code group;

said bistable devices being activated by said analog signal with certain ones thereof oscillating between their two stable conditions throughout said predetermined period of time in response to said damped oscillatory signal;

the amplitude characteristic of said damped oscillatory signal being selected to cause said bistable devices to indicate their final stable condition in a predetermined time sequence, one of said bistable devices being set at the end of the first of said time intervals to indicate its final stable condition and the others of said bistable devices being set at the end of successive ones of said time intervals to indicate their final stable condition;

a source of control signals having a frequency equal to said given frequency, a predetermined amplitude and a predetermined polarity relative to the polarity of the output signals of bistable devices;

a first means coupled to said bistable devices and said source of control signals for combining the output signals of said bistable devices with said control signal to cancel the output signals from said bistable devices when any of said bistable devices is in a predetermined one of the two stable condition after each of said bistable devices is set to indicate its final stable condition; and a second means coupled to said first means to produce an output pulse whenever the output signals of said bistable devices are not canceled in said first means.

11. In a binary code generator having a plurality of bistable devices oscillated between their two stable conditions by a damped oscillatory signal having a given frequency superimposed on the pulse signal to be coded until the oscillation of all said bistable devices cease and the digital representation of said pulse signal amplitude is available in parallel form, the ampitude characteristic of said damped oscillatory signal being selected to cause said bistable devices to indicate their final stable condition in a predetermined time sequence at regular intervals prior to cessation of the oscillation thereof, a parallel-to-serial converter comprising:

a source of control signals having a frequency equal to said given frequency, a predetermined amplitude and a predetermined polarity relative to the polarity of the output signals of said bistable devices; and a circuit arrangement coupled to said bistable devices and said source of control signals for combining the output signals of said bistable devices with said control signal to cancel the output signals from said bistable devices when any of said bistable devices is in a predetermined one of the two stable conditions after each of said bistable devices is set to indicate its final stable condition and to produce an output pulse when any of said bistable devices is in the other of the two stable conditions after each of said bistable devices is set to indicate its final stable condition.

12. A converter according to claim 11, wherein said control signal has an amplitude equal to the combined amplitude of the output signals of said bistable devices when said bistable devices are in said predetermined one of the two stable conditions and a polarity opposite to the polarity of the output signal of said bistable devices representing the two stable conditions of said bistable devices; and said circuit arrangement includes a combining circuit coupled to each of said bistable devices and said source of control signals to algebraically combine the output signals of all said bistable devices and said control signal.

13. A converter according to claim 12, further including a capacitor coupled to said combining circuit to store the peak voltage of said combined output signals of said bistable devices and said control signal; and a differentiator coupled to said capacitor to differentiate said stored peak voltage to produce spikes representing the stable conditions of said bistable devices at time intervals corresponding to said time intervals at which said bistable devices are set to indicate their final stable condition.

14. A converter according to claim 13, further including a slicer and pulse shaping network coupled to said differentiator to shape said spikes into pulses.

15. A converter according to claim 11, wherein said control signal has an amplitude equal to the amplitude of the output signals of one of said bistable devices when said one of said bistable devices is in said predetermined one of the two stable conditions and a polarity opposite to the polarity of the output signals of said bistable devices representing the two stable conditions of said bistable devices; and said circuit arrangement includes a plurality of combining circuits coupled in common to said source of control signals, and means to couple separately each of said bistable devices to associated ones of said combining circuit to separately algebraically combine the output signals of said bistable device with said control signals.

16. A converter according to claim 15, further including a capacitor coupled to each of said combining circuits to store the peak voltage of said combined output signals of an associated one of said bistable devices and said control signal; and a differentiator coupled to each of said capacitors to differentiate each of said stored peak voltage to produce spikes representing the stable conditions of said bistable devices at time intervals corresponding to said time intervals at which said bistable devices are set to indicate their final stable condition.

17. A converter according to claim 16, a slice and pulse shaping network coupled in common to the output of said differentiators to shape said spikes into pulses.

18. A converter according to claim 11, said circuit arrangement includes a plurality of bistable elements, each coupled to an associated one of said bistable devices, a source of current, a plurality of gates coupled in common to said source of current and said source of control signals and means coupling each of said gates to an associated one of said bistable elements.

19. A converter according to claim 11, wherein said circuit arrangement includes a plurality of differentiators, each coupled to an associated one of said bistable devices and said source of control signal, a plurality of slicers, each coupled to an associated one of said differentiators, and a plurality of combining circuits coupled in common said slicer associated with said source of control signals and individually to said slicers associated with said associated bistable devices.

References Cited

UNITED STATES PATENTS

| | | | |
|---|---|---|---|
| 2,922,151 | 1/1960 | Reiling | 340—347 |
| 3,056,085 | 9/1962 | James et al. | 340—347 |
| 3,216,002 | 11/1965 | Hoffman | 340—347 |

MAYNARD R. WILBUR, *Primary Examiner.*

W. W. NIELSEN, *Assistant Examiner.*